(12) United States Patent
Lee et al.

(10) Patent No.: US 12,435,642 B2
(45) Date of Patent: Oct. 7, 2025

(54) OPTICAL IN-SITU INSPECTION SYSTEM

(71) Applicant: RTX Corporation, Farmington, CT (US)

(72) Inventors: Jeremiah C. Lee, Coventry, CT (US); David L. Lincoln, Cromwell, CT (US); Scott Goyette, Moosup, CT (US); Zaffir A. Chaudhry, Portland, CT (US); Danbing Seto, Avon, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/238,065

(22) Filed: Aug. 25, 2023

(65) Prior Publication Data

US 2025/0067194 A1   Feb. 27, 2025

(51) Int. Cl.
| | |
|---|---|
| *F01D 21/00* | (2006.01) |
| *G01N 21/88* | (2006.01) |
| *G01P 3/38* | (2006.01) |

(52) U.S. Cl.
CPC ........... *F01D 21/003* (2013.01); *G01N 21/88* (2013.01); *G01P 3/38* (2013.01); *F05D 2220/32* (2013.01);
(Continued)

(58) Field of Classification Search
CPC . F04D 27/001; G01P 3/38; G01P 3/40; G01B 11/30; F01D 21/003; F01D 25/002;
(Continued)

(56) References Cited

U.S. PATENT DOCUMENTS

| | | | | |
|---|---|---|---|---|
| 4,326,804 A | * | 4/1982 | Mossey | G01B 11/14 250/559.38 |
| 4,830,449 A | | 5/1989 | Spillman, Jr. | |

(Continued)

FOREIGN PATENT DOCUMENTS

| | | | | |
|---|---|---|---|---|
| DE | 102012014937 A1 | * | 4/2013 | ......... G01N 21/9515 |
| DE | 202015009854 U1 | * | 11/2020 | |

(Continued)

OTHER PUBLICATIONS

Shi, J. Spacecraft Pose Estimation using Principal Component Analysis and a Monocular Camera. AIAA SciTech forum. Jan. 9-13, 2017. AIAA Guidance, Navigation, and Control Conference. (Year: 2017).*

(Continued)

*Primary Examiner* — Topaz L. Elliott
(74) *Attorney, Agent, or Firm* — Bachman & LaPointe, P.C.

(57) ABSTRACT

An in-situ system for a gas turbine engine blade inspection including a sensor system configured to capture images of a forward surface of at least one gas turbine engine blade; a processor coupled to the sensor system, the processor configured to determine damage to the at least one gas turbine engine blade based on video analytics; and a tangible, non-transitory memory configured to communicate with the processor, the tangible, non-transitory memory having instructions stored therein that, in response to execution by the processor, cause the processor to perform operations comprising receiving, by the processor, data for the forward surface of at least one gas turbine engine blade from the sensor system; determining, by the processor, a rotational speed of a fan; and determining, by the processor, a fan synchronization.

8 Claims, 4 Drawing Sheets

(52) U.S. Cl.
CPC ...... *F05D 2260/10* (2013.01); *F05D 2260/80* (2013.01); *G01N 2291/2693* (2013.01)

(58) Field of Classification Search
CPC ........ F01D 5/005; F01D 25/285; F01D 17/02; F05D 2260/83; F05D 2260/80; F05D 2270/8041; F05D 2220/36; F05D 2270/80; G01M 5/0033; G01M 11/081

See application file for complete search history.

(56) References Cited

U.S. PATENT DOCUMENTS

| | | | |
|---|---|---|---|
| 11,373,317 B1* | 6/2022 | Hay | G06T 7/0004 |
| 12,055,053 B1* | 8/2024 | Goyette | F01D 21/06 |
| 2002/0126897 A1* | 9/2002 | Ueda | G06V 40/20 |
| | | | 382/197 |
| 2005/0270519 A1* | 12/2005 | Twerdochlib | G01P 3/488 |
| | | | 356/24 |
| 2006/0078193 A1 | 4/2006 | Brummel et al. | |
| 2007/0085904 A1 | 4/2007 | Heyworth | |
| 2011/0025844 A1* | 2/2011 | Hori | G06T 7/70 |
| | | | 348/135 |
| 2013/0162846 A1* | 6/2013 | Xie | F01D 21/003 |
| | | | 348/207.11 |
| 2014/0253715 A1* | 9/2014 | Hori | G06T 7/0008 |
| | | | 348/82 |
| 2014/0267678 A1* | 9/2014 | Kobayashi | H04N 7/183 |
| | | | 348/82 |
| 2016/0011078 A1* | 1/2016 | Ruhge | G01N 21/954 |
| | | | 73/112.01 |
| 2016/0177776 A1* | 6/2016 | Ruhge | F01D 5/22 |
| | | | 73/112.01 |
| 2018/0079533 A1* | 3/2018 | Suchezky | B64U 20/87 |
| 2018/0158223 A1* | 6/2018 | Kobayashi | G02B 23/2484 |
| 2019/0338666 A1 | 11/2019 | Finn et al. | |
| 2019/0339206 A1 | 11/2019 | Xiong et al. | |
| 2020/0056501 A1* | 2/2020 | Eastment | G06T 7/001 |
| 2023/0160834 A1 | 5/2023 | Lincoln et al. | |
| 2023/0250804 A1* | 8/2023 | Farb | F03B 15/06 |
| 2024/0352938 A1* | 10/2024 | Goyette | F04D 29/542 |

FOREIGN PATENT DOCUMENTS

| | | | | |
|---|---|---|---|---|
| EP | 0027946 A1 * | 5/1981 | | |
| EP | 4009272 A1 | 6/2022 | | |
| EP | 4450771 A2 | 10/2024 | | |
| GB | 2605703 A | 10/2022 | | |
| RU | 2762269 C1 * | 12/2021 | | |
| WO | WO-2014031955 A1 * | 2/2014 | ........... | F01D 21/003 |

OTHER PUBLICATIONS

Zhao, G. High Speed Rotation Estimation with Dynamic Vision Sensors. Sep. 6, 2022. Accessed from: arxiv.org/abs/2209.02205 (Year: 2022).*

Extended European Search Report for counterpart EP Application No. 24195651.5 mailed Feb. 18, 2025.

Extended European Search Report for counterpart EP Application No. 24195656.4 mailed Feb. 7, 2025.

* cited by examiner

OPTICAL IN-SITU INSPECTION SYSTEM

BACKGROUND

The present disclosure is directed to an optical inspection system. Particularly, the disclosure is directed to an optical inspection system for fan blades comprising a high speed digital camera.

Gas turbine engine (turbo fan or turbo jet engine) components, such as blades or vanes, may suffer irregularities from manufacturing or wear and damage during operation, for example, due to erosion, hot corrosion (sulfidation), cracks, dents, nicks, gouges, and other damage, such as from foreign object damage. Detecting this damage may be achieved by images, videos, or depth data for aircraft engine blade inspection, power turbine blade inspection, internal inspection of mechanical devices, and the like. A variety of techniques for inspecting by use of images, videos, or 3D sensing may include capturing and displaying images, videos, or depth data to human inspectors for manual defect detection and interpretation. Human inspectors may then decide whether any defect exists within those images, videos, or depth data.

In order to optically monitor in-situ fan blades it is imperative to accurately know the rotational speed of the fan during engine conditions, such as during shutdown. The N1 and N2 sensors that measure the rotational speed of the engine are not adequate sources of information for in-situ optical monitoring.

It is also necessary for the in-situ camera-based diagnostic system that monitors rotating blade conditions to have the shutter of the high-speed camera in synchronization with the rotational position of the blades. Synchronization of the shutter with the rotational position of the blades facilitates and optimizes consistent picture frames or poses for analytics to detect blade damage.

Currently there is no available sensor to provide a signal to indicate the rotational position of the blade or hub of the blade. The high resolution and high shutter speed camera would not know when to trigger the shutter to produce footage such that they are all of the same pose or framing. Footage so obtained would show the fan blade or blades at different position and orientation, and also of varying illumination and exposure. This would complicate the image analytics algorithms and also in counting the number of the detected surface defects on the fan blades.

What is needed is the use of high-speed cameras to measure the rotational speed of the fan as well as indicate the rotational position of the fan blades to provide synchronization.

SUMMARY

In accordance with the present disclosure, there is provided an in-situ system for a gas turbine engine blade inspection comprising a sensor system configured to capture images of a surface of at least one gas turbine engine blade; a processor coupled to the sensor system, the processor configured to determine damage to the at least one gas turbine engine blade based on video analytics; and a tangible, non-transitory memory configured to communicate with the processor, the tangible, non-transitory memory having instructions stored therein that, in response to execution by the processor, cause the processor to perform operations comprising receiving, by the processor, data for the surface of at least one gas turbine engine blade from the sensor system; determining, by the processor, a rotational speed of a fan; and determining, by the processor, a fan synchronization signal.

A further embodiment of any of the foregoing embodiments may additionally and/or alternatively include the sensor comprises a camera operating at a high frame rate.

A further embodiment of any of the foregoing embodiments may additionally and/or alternatively include causing the processor to perform operations further comprising at least one of: recording a brightness of at least one of a light diode or a pixel in a frame to produce a periodic plot; and corresponding a point on the plot of coefficients from the periodic plot to a particular frame of the blade appearing in front of the sensor system.

A further embodiment of any of the foregoing embodiments may additionally and/or alternatively include causing the processor to perform operations further comprising: recording a segment of footage to perform a principal component analysis; creating a list of dominant modes of a series of footage in the segment; projecting all the footage in the segment onto a leading order mode; and providing a frequency modulated sinusoidal time variation of coefficients plot, wherein each of a point on the plot of coefficients correspond to a particular frame of the blade appearing in front of the sensor system.

A further embodiment of any of the foregoing embodiments may additionally and/or alternatively include causing the processor to perform operations further comprising: predetermining an optimal image frame passing in front of the sensor system; using the predetermined optimal image frame phase to trigger a shutter in the sensor system; and identifying the predetermined optimal image frame pose (phase) as a trigger phase.

A further embodiment of any of the foregoing embodiments may additionally and/or alternatively include causing the processor to perform operations further comprising projecting the footage obtained by the sensor system onto a stored Principal Component Analysis mode, responsive to a main sequency of recording the blades.

A further embodiment of any of the foregoing embodiments may additionally and/or alternatively include causing the processor to perform operations further comprising: comparing a value of the coefficients with a value of the trigger phase; and producing a trigger signal to control the sensor system to take an image of the blade, responsive to the value of the coefficients matching with the value of trigger phase.

A further embodiment of any of the foregoing embodiments may additionally and/or alternatively include causing the processor to perform operations further comprising: repeating the previous steps as time progresses until the blade on a rotor ceases to rotate.

A further embodiment of any of the foregoing embodiments may additionally and/or alternatively include causing the processor to perform operations further comprising: producing every single picture of at least one blade to include the same pose, illumination and exposure condition.

A further embodiment of any of the foregoing embodiments may additionally and/or alternatively include the gas turbine engine blade is selected from the group consisting of a fan blade a vane, a compressor blade, a compressor vane, a turbine blade, and a turbine vane.

In accordance with the present disclosure, there is provided a method for in-situ inspection of a gas turbine engine fan, comprising: positioning a sensor to capture images of a surface of at least one gas turbine engine fan blade; coupling a processor to the sensor, the processor configured to determine damage to the at least one gas turbine engine fan blade based on image analytics; wherein the processor performs operations comprising: receiving, by the processor, imaging data for the surface of at least one gas turbine engine fan blade from the sensor system; determining, by the processor, a rotational speed of the fan; and determining, by the processor, a fan synchronization.

A further embodiment of any of the foregoing embodiments may additionally and/or alternatively include the method further comprising at least one of: recording a brightness of at least one of a light diode or a pixel or as a feature in a frame to produce a periodic plot; and corresponding a point on the plot of coefficients from the periodic plot to a particular frame of the blade appearing in front of the sensor system.

A further embodiment of any of the foregoing embodiments may additionally and/or alternatively include the method further comprising recording a segment of footage to perform a principal component analysis; creating a list of dominant modes of a series of footage in the segment; projecting all the footage in the segment onto a leading order mode; and providing a frequency modulated sinusoidal time variation of coefficients plot, wherein each of a point on the plot of coefficients correspond to a particular frame of the blade appearing in front of the sensor system.

A further embodiment of any of the foregoing embodiments may additionally and/or alternatively include the method further comprising predetermining an optimal image frame passing in front of the sensor system; using the predetermined optimal image frame phase to trigger a shutter in the sensor system; and identifying the predetermined optimal image frame pose as a trigger phase.

A further embodiment of any of the foregoing embodiments may additionally and/or alternatively include the method further comprising projecting the footage obtained by the sensor system onto a stored Principal Component Analysis mode, responsive to a main sequence of recording the blades.

A further embodiment of any of the foregoing embodiments may additionally and/or alternatively include the method further comprising comparing a value of the coefficients with a value of the trigger phase; and producing a trigger signal to control the sensor system to take an image of the blade, responsive to the value of the coefficients matching with the value of trigger phase.

A further embodiment of any of the foregoing embodiments may additionally and/or alternatively include the method further comprising repeating the previous steps as time progresses until the blade on a rotor ceases to rotate.

A further embodiment of any of the foregoing embodiments may additionally and/or alternatively include the method further comprising producing every single picture of at least one blade to include the same pose, illumination and exposure condition.

A further embodiment of any of the foregoing embodiments may additionally and/or alternatively include capturing images are created during gas turbine engine operational conditions selected from the group consisting of coasting, spool-up, and spool-down, including at least one complete revolution.

A further embodiment of any of the foregoing embodiments may additionally and/or alternatively include the sensor comprises at least one of, multiple sensors, a camera, a video camera, a high-speed camera, high-frame-rate camera, and a depth sensor.

Other details of the optical in-situ inspection system are set forth in the following detailed description and the accompanying drawings wherein like reference numerals depict like elements.

DETAILED DESCRIPTION

Figure 1:
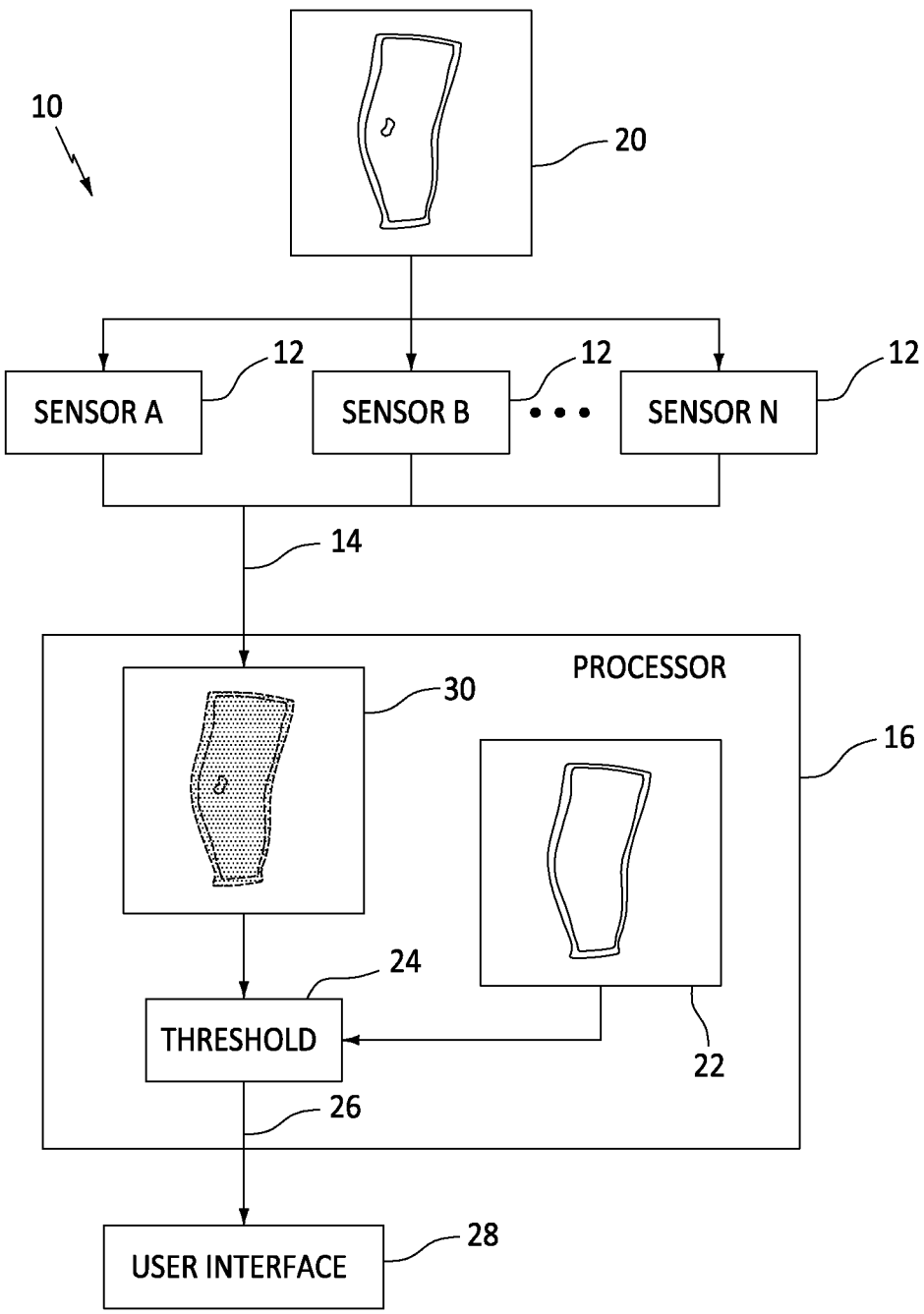
FIG. 1 is a schematic diagram of an exemplary fan blade inspection system in accordance with various embodiments.

Referring to FIG. 1, a schematic illustration of a damage detection system 10 for detecting a defect or damage to a component 20 is shown, in accordance with various embodiments. Damage detection system 10 may be configured to perform 3D imaging of a component 20. Component 20 may include a component on an aircraft, such as an engine component, such as a fan blade or an airfoil (e.g., a blade). Component 20 may be scanned or sensed by one or more sensors 12 to obtain data 14 about the component 20. Data 14 may be obtained, for example, from a high speed-camera, camera, a single point sensor, a single 1D sensor, a single 2D sensor, a single 3D sensor, or multiple sensors of multiple types. In various embodiments, data 14 may be obtained by rotating, panning, or positioning the sensor(s) 12 relative to the component 20 to capture data 14 from multiple viewpoint angles, perspectives, and/or depths. Further, the component 20 may be rotated or positioned relative to the sensor(s) 12 to obtain data 14 from multiple viewpoints, perspectives, and/or depths. An array of sensors 12 positioned around component 20 may be used to obtain data 14 from multiple viewpoints. Thus, either of the sensor(s) 12 or component 20 may be moved or positioned relative to the other and relative to various directions or axes of a coordinate system to obtain sensor information from various viewpoints, perspectives, and/or depths. Further, sensor 12 may scan, sense, or capture information from a single position relative to component 20.

The sensor(s) 12 may include a one-dimensional (1D), 2D, 3D sensor (depth sensor) and/or a combination and/or array thereof. Sensor 12 may be operable in the electromagnetic or acoustic spectrum capable of producing a 3D point cloud, occupancy grid or depth map of the corresponding dimension(s). Sensor 12 may provide various characteristics of the sensed electromagnetic or acoustic spectrum including intensity, spectral characteristics, polarization, etc. In various embodiments, sensor 12 may include a distance, range, and/or depth sensing device. Various depth sensing sensor technologies and devices include, but are not limited to, a structured light measurement, phase shift measurement, time of flight measurement, stereo triangulation device, sheet of light triangulation device, light field cameras, coded aperture cameras, computational imaging techniques, simultaneous localization and mapping (SLAM), imaging radar, imaging sonar, echolocation, laser radar, scanning light detection and ranging (LIDAR), flash LIDAR, or a combination comprising at least one of the foregoing. Different technologies can include active (transmitting and receiving a signal) or passive (only receiving a signal) and may operate in a band of the electromagnetic or acoustic spectrum such as visual, infrared, ultrasonic, etc. In various embodiments, sensor 12 may be operable to produce depth from defocus, a focal stack of images, or structure from motion.

In various embodiments, sensor 12 may include an image capture device, such as an optical device having an optical lens, such as a camera, mobile video camera or other imaging device or image sensor, capable of capturing 2D still images or video images. Sensor 12 may include two or more physically separated cameras that may view a component from different angles, to obtain visual stereo image data.

In various embodiments, sensor 12 may include a structured light sensor, a line sensor, a linear image sensor, or other 1D sensor. Further, sensor 12 may include a 2D sensor, and damage detection system 10 may extract 1D or 2D information from the 2D sensor data. 2D data 14 may be synthesized by processor 16 from multiple 1D data 14 from a 1D sensor 12 or from multiple 1D or 2D data 14 extracted from a 2D sensor 12. The extraction of 1D or 2D data 14 from 2D data 14 may include retaining only data that is in focus. Even further, sensor 12 may include a position and/or orientation sensor such as an inertial measurement unit (IMU) that may provide position and/or orientation information about component 20 with respect to a coordinate system or other sensor 12. The position and/or orientation information may be beneficially employed in synthesizing 2D data from 1D data, or in aligning 1D, 2D or 3D information to a reference model as discussed elsewhere herein.

Data 14 from sensor(s) 12 may be transmitted to one or more processors 16 (e.g., computer systems having a central processing unit and memory) for recording, processing and storing the data received from sensors 12. Processor 16 may include a general-purpose processor, a digital signal processor (DSP), an application specific integrated circuit (ASIC), a field programmable gate array (FPGA) or other programmable logic device, discrete gate or transistor logic, discrete hardware components, or any combination thereof. Processor 16 may be in communication (such as electrical communication) with sensors 12 and may be configured to receive input, such as images and/or depth information from sensors 12. Processor 16 may receive data 14 about component 20 captured and transmitted by the sensor(s) 12 via a communication channel. Upon receiving the data 14, the processor 16 may process data 14 from sensors 12 to determine if damage or defects are present on the component 20.

In various embodiments, processor 16 may receive or construct 2D or 3D information 30 corresponding to the component 20. The construction of 3D information from 1D or 2D information may include tiling, mosaicking, stereopsis, structure from motion, structure from multiple viewpoints, simultaneous localization and mapping, and the like.

In various embodiments, processor 16 of damage detection system 10 may classify the damage and determine the probability of damage and/or if the damage meets or exceeds a threshold 24. Threshold 24 may be an input parameter, may be based on reference model 22, may be from user input, and the like. Processor 16 may provide an output 26 to a user interface 28 indicating the status of the component 20. User interface 28 may include a display. Damage detection system 10 may display an indication of the damage to component 20, which may include an image and/or a report. In addition to reporting any defects in the component, output 26 may also relay information about the type of defect, the location of the defect, size of the defect, etc. If defects are found in the inspected component 20, an indicator may be displayed on user interface 28 to alert personnel or users of the defect.

Figure 2:
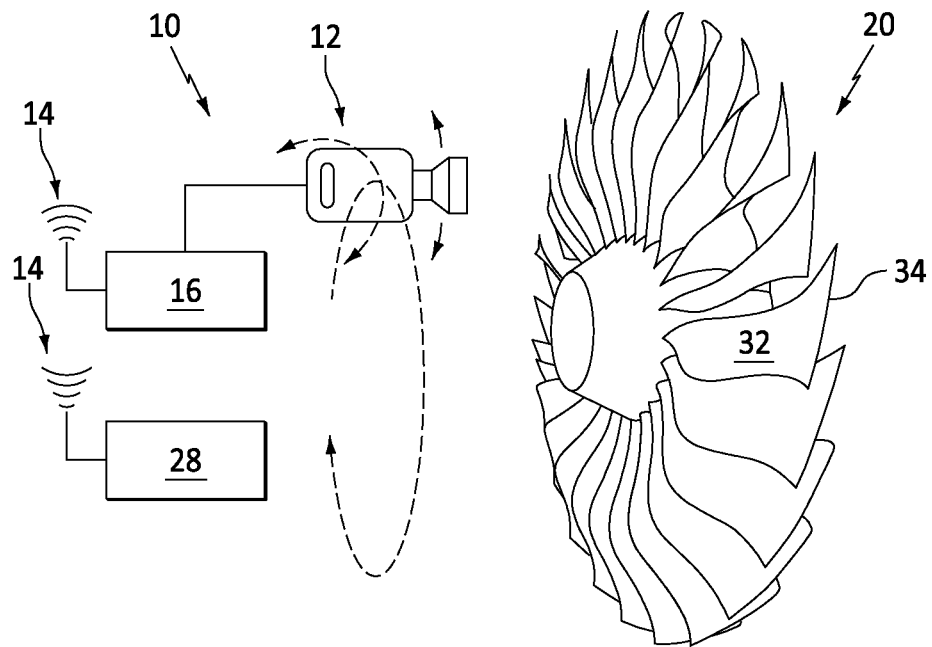
FIG. 2 is a schematic diagram of an exemplary fan blade inspection system.

Referring also to FIG. 2, the exemplary damage detection system 10 can be seen. FIG. 2 depicts an external, unattached inspection system. In this disclosure, the unattached inspection system depicted in FIG. 2 is considered to be in-situ. In another exemplary embodiment, the system 10 can include an optical in-situ, i.e., built-in, system for a gas turbine engine blade inspection. The component 20 can be a blade of a fan, a vane, a blade of a compressor, a vane of a compressor, a blade of a turbine, or a vane of a turbine. The exemplary embodiment shown in FIG. 2 includes a fan as the component 20. The sensor 12, is shown as a mobile video camera system 12 configured to capture video images of an entire forward surface 32 of at least one gas turbine engine blade 34. The camera 12 can be mobile (shown as arrows), such that the camera can move, pan, slide or otherwise reposition to capture the necessary image data 14 of the entire forward surface 32. The mobile video camera system 12 can be moved through location and pose variation to image the entire forward surface 32 of each of the blades 34 of the gas turbine engine 38. The imaging of the blade 34 of the gas turbine engine 38 can be done either continuously or intermittently. In another exemplary embodiment, the imaging is conducted during gas turbine engine operational conditions such as coasting, spool-up, and spool-down, including at least one complete revolution.

The processor 16 may be coupled to the mobile video camera (system) 12. The processor 16 can be configured to determine damage to the gas turbine engine blade 34 based on video analytics. The processor 16 is shown with a transceiver configured to communicate wirelessly with the user interface 28. In another exemplary embodiment the system can be hard wired. The processor 16 can be configured to automatically report damage and archive the damage for trending and condition-based-maintenance.

Figure 3:
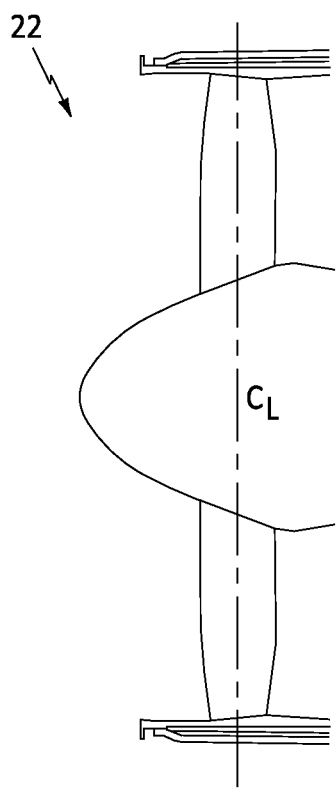
FIG. 3 illustrates an exemplary fan with a fan blade plane (centerline in side view).

The processor 16 can be configured to receive the data for the entire forward surface of the gas turbine engine from the video camera system 12. The processor 16 can synthesize the entire forward surface view using a simultaneous localization and mapping (SLAM) process, structure from motion process, and the like program as described elsewhere herein. The processor 16 can include a model registration process based on blade plane determination as shown in FIG. 3. The blade plane may be determined by mathematically fitting a flat 2-dimensional plane to all, or a subset, of the data 14. In one embodiment, a subset of data comprising the most radially extreme data points (indicative of the blade tips) is used in the plane fitting. The plane may be fit by standard linear regression. The blade plane may be used for damage detection (e.g., for position of the blades with respect to the plane), for an initial orientation for registration of a single blade model, and the like.

Figure 4:
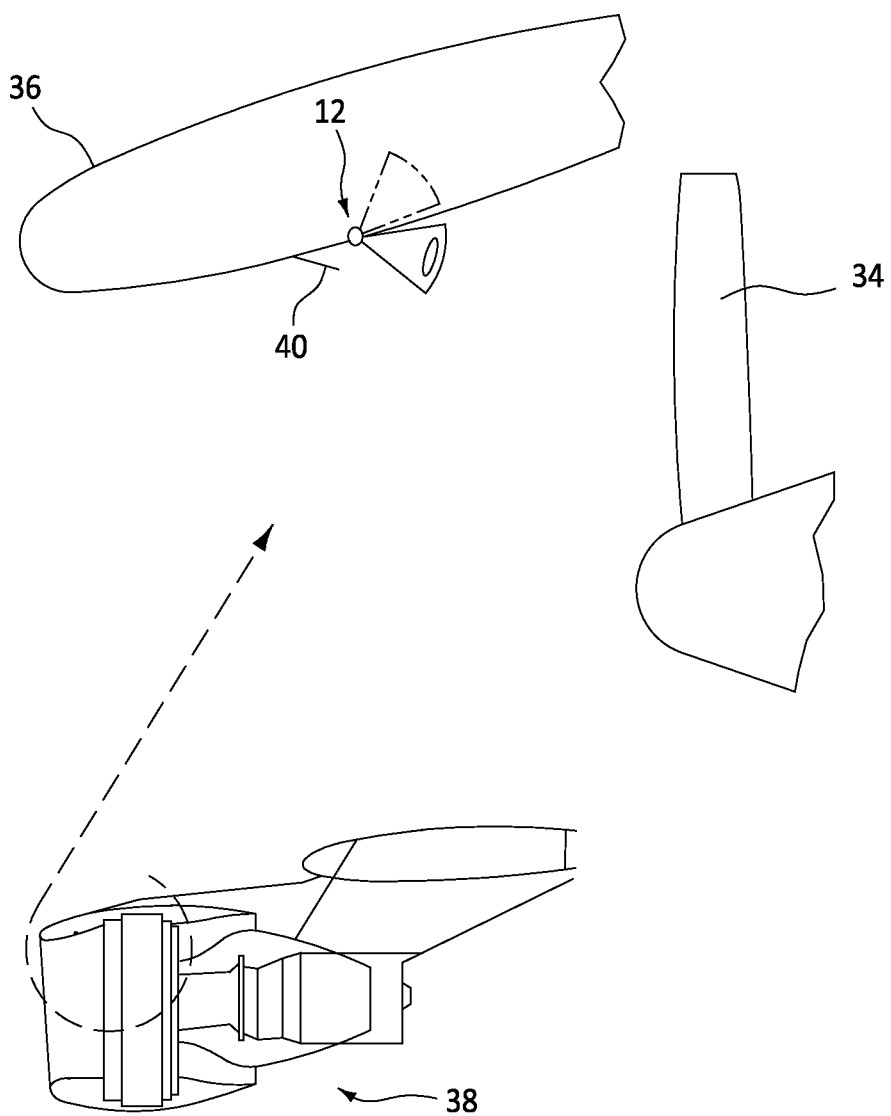
FIG. 4 is a schematic diagram of the exemplary fan blade inspection system in-situ.

Referring also to FIG. 4, the sensor 12 is configured as a mobile camera integral with and coupled to a nacelle 36 of a gas turbine engine 38. In another exemplary embodiment, the camera 12 can be coupled to an engine washing system (not shown). In this disclosure, the camera 12 coupled to an engine washing system is considered to be in-situ. In an exemplary embodiment, the mobile video camera system 12 can include lighting within a visible spectrum and/or an infrared spectrum. In another exemplary embodiment, the mobile video camera system 12 can include a shroud 40 configured to protect the mobile video camera system 12 from impact damage and debris entering the engine 38. In another exemplary embodiment, the mobile video camera system 12 can retract into a protected position away from exposure to debris. In yet another embodiment, video camera system 12 may be mounted substantially flush with an inner surface of a gas turbine engine, or the like, or be mounted behind a protective window which is substantially flush with the inner surface. In these embodiments, video camera 12 may require special design for high-temperature operation such as special cooling, additional relay optics, high-temperature fiber-optic light guides, and the like.

To maximize the overall efficiency of the optical inspection system 10 and also to optimize the performance of the image analytics software in the processor 16, it is important to obtain footage and/or images framed the same way. That is, each image should capture a set of fan blades 34, or a fan blade 34, or a portion thereof, in the same pose. The image of the fan blade 34 should be captured in the same location in the image area. For example, a blade 34 can be centered on the frame or have a number of blades 34 centered in the picture frame in an identical way.

Capturing the image of the blade 34 in an identical way would ensure that the lighting condition for each frame obtained in this way would be identical, further providing footage that can simplify the design and operation of the image analytics software in processor 16.

Unfortunately, in many cases, there is no sensor signal that identifies the rotational position of a rotor, such as a fan hub. However, such a synchronization signal can be produced by the sensor 12 when the sensor is a high-speed video or still camera 12.

The camera 12 can be used to produce the synchronization signals and can be the same camera 12 used to obtain high resolution footage. In another exemplary embodiment a separate dedicated camera 12 or a combination of sensing diodes 12 can produce the signal data 14. The camera images used for synchronization need not be of high quality (such as high resolution, of fine optical quality). However, camera 12 does need to be able to take footage at a high speed and at a high frame rate commensurate with the speed of the rotor.

Video footage or a light detection signal that adequately resolves the rotational motion of the blades can be employed. A low resolution video that can record high enough frame rates to resolve the rotational motion of the fan hub above the values for high resolution recordings can be employed. For example, a maximum frame rate of ~20 kHz would be suitable for most gas turbine engines.

In an exemplary embodiment, the system 10 as a whole would not start recording the fan blades 34 for damage assessment until the fan rotation speed falls below a threshold in order to avoid motion bluffing and motion induced blurring of the footage.

Figure 5:
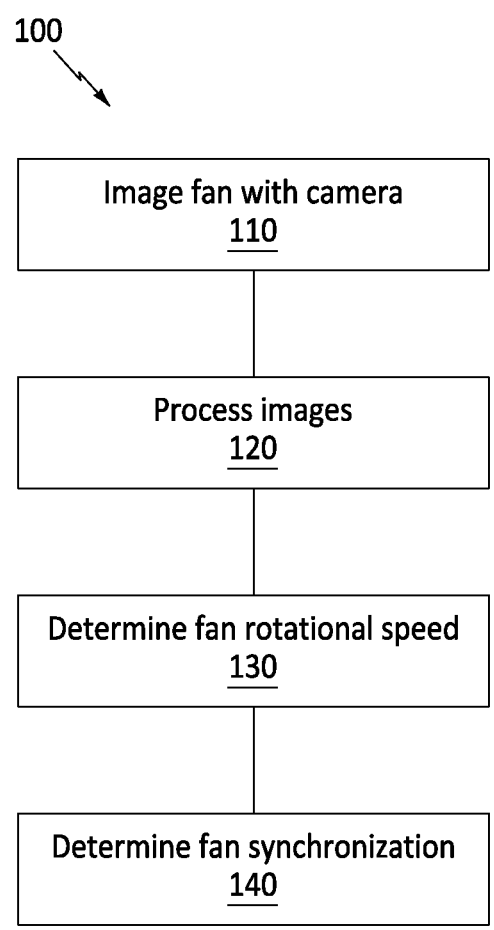
FIG. 5 is a process map of an exemplary fan blade inspection system in accordance with various embodiments.

Referring also to FIG. 5, a process map is shown. The process 100 to synchronize the fan 20 can be performed by the camera 12. The camera 12 captures images of the fan 20 at step 110. The processor 16 processes the images at step 120. The process 100 includes determining the rotational speed of the fan 20 at step 130. At step 140, the synchronization of the fan 20 is determined.

Instead of having additional sensors 12 to measure the fan 20 speed, using a camera 12 to take videos to be processed by a simple analytics algorithm, the rotational speed of the fan 20 can be determined accurately. To make this system capable of making measurement of very high rotational speed, one can reduce the resolution of the high-speed camera 12 to speed up the camera operation/processing and the associated recording and analysis.

The system 10 can record videos of the rotating fan blades 34 from the moment the fan 20 started spinning down. The system 10 can compute the rotational speed of the fan 20 utilizing the footage of the videos.

The video footage of a small field of view of a rotating fan 20 will exhibit a high degree of periodicity with the associated frequency shifting as the fan rotating changes (in our case slowing down).

A simple algorithm can be employed to extract this frequency information from which the fan rotation speed can be computed. This method works with a very low-resolution, low-quality video footage. The process includes deriving a reduced order model (a basis) from a segment of the video and then performing a projection of the sequence of frames of the video onto the leading order term of this basis to obtain a time series of coefficients.

The periodicity of the footage is now condensed into a time series of a single variable. A Fast Fourier Transform (FFT) of the coefficients can be obtained and provides the rotational speed.

The algorithm as a whole involves simple and computationally efficient linear algebra operations and the Fast Fourier Transform algorithm, and thus can be completed with little computational load and computational time.

Multiple applications of this method step 110 to consecutive segments of the video can also be used to determine the deceleration or acceleration of the fan 20 as well. Once a speed threshold is reached, the optical system 10 can be triggered to start the fan blade 34 condition monitoring process.

The same camera 12 that is used to obtain the synchronization signal can be used to determine fan 20 rotational speed. During an initial stage of measuring the rotational speed of the fan 20, one can start recording a segment of the footage to be analyzed in the following way to extract the synchronization information. This process can continue subsequently during the time when the system 10 actively records footage during damage detection operations. Camera 12 would be switching its two roles in tandem.

The video or the signals from the photo diodes data 14 captured from the light reflected from the rotating set of blades 34 is highly periodic. The video data 14 contains this periodicity but with a slowly varying frequency that corresponds to the slowing down or speeding up of the rotation of the fan 20. Determining the fan speed 110 can be extracted in many different ways by numerical methods to determine the rotational speed as well as to record the phase (the position) of a fan blade appearing on the sensor of a camera 12.

A simple algorithm to do this, for example, can be employed. One can record the brightness of one or several selected light diodes, or when a camera is used, pixels or the average values of all or some of the pixels or a feature, such as an edge in the frame to produce data to perform an analysis known as optical flow, or a simple periodic plot. Each point on the plot of coefficients correspond to a particular frame of the fan blade appearing in front of the camera 12.

Alternatively, one can also record a short segment of the footage (in a moving window in time) to perform a principal component analysis. The outcome of this analysis is a list of dominant modes of the series of footage in this short segment.

Projection of all the footage in this segment onto the leading order mode provides a frequency modulated sinusoidal time variation of the coefficients. Each point on this plot of coefficients (phase) correspond to a particular frame of the fan blade appearing in front of the camera 12. The one that corresponds to the optimal image frame passing in front of the camera 12 can be easily predetermined; and this phase can be used to trigger the camera's shutter, identified as a trigger phase.

Once the main sequency of recording the fan blades starts, the footage obtained by the trigger camera is projected onto the stored Principal Component Analysis (PCA) mode. Principal component analysis (PCA) is a technique for analyzing large datasets containing a high number of dimensions/features per observation, increasing the interpretability of data while preserving the maximum amount of information, and enabling the visualization of multidimensional data. The value of the coefficients will be compared with the value of trigger phase and when matched, one can produce the camera trigger signal to control the camera 12 to take the picture of the fan blade 34. This process can be repeated as time progresses until the fan 20 ceases to rotate. This way every single picture of the fan blades 34 will have the same pose, illumination and exposure condition.

A technical advantage of the disclosed optical inspection system can include cameras operating at high frame rate can be deployed and imbedded in an engine to record the surface conditions of the fan blades when the fan is rotating below a certain threshold (e.g., when the engine is powering down).

Another technical advantage of the disclosed optical inspection system can include providing a straightforward way to use a camera meant for taking footage of the fan blades, or a separate dedicated camera to determine the correct and optimal time to trigger the shutter to take these high-resolution pictures of the same exposure and pose.

Another technical advantage of the disclosed optical inspection system can include using the same optical system to measure the rotational speed of the fan which eliminates the need to have a second measurement system, such as an eddy current sensor, for the fan speed when the engine is powering off.

Another technical advantage of the disclosed optical inspection system can include the utilization of a high-speed camera and the associated data analytics techniques in evaluating the fan speed is intrinsically a digital tachometer with accuracy commensurate of that of the high-speed camera's digital shutter.

Another technical advantage of the disclosed optical inspection system can include the rpm threshold to start the fan condition inspection using the same high-speed camera is always consistent.

Another technical advantage of the disclosed optical inspection system can include having no need for additional verification and assessment of sensor noise and accuracy.

There has been provided an optical inspection system. While the optical inspection system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A method for in-situ inspection of a gas turbine engine fan, comprising:

positioning a sensor to capture images of a surface of at least one gas turbine engine fan blade;

coupling a processor to the sensor, the processor configured to determine damage to the at least one gas turbine engine fan blade based on image analytics; wherein the processor performs operations comprising:

receiving, by the processor, imaging data for the surface of the at least one gas turbine engine fan blade from the sensor;

determining, by the processor, a rotational speed of the fan; and determining, by the processor, a fan synchronization;

recording a segment of footage to perform a principal component analysis;

performing the principal component analysis to create a list of dominant modes of a series of footage in the segment;

projecting all the footage in the segment onto a leading order mode; and providing a frequency modulated sinusoidal time variation of coefficients plot, wherein each point on the plot of coefficients corresponds to a particular frame of the blade appearing in front of the sensor.

2. The method for in-situ inspection of a gas turbine engine fan of claim 1, further comprising:

recording a brightness of at least one of a light diode or a pixel or as a feature in a frame to produce a periodic plot.

3. The method for in-situ inspection of a gas turbine engine fan of claim 1, further comprising:

predetermining an optimal image frame passing in front of the sensor;

using a predetermined optimal image frame phase to trigger a shutter in the sensor; and identifying a predetermined optimal image frame pose as a trigger phase.

4. The method for in-situ inspection of a gas turbine engine fan of claim 3 further comprising:

comparing a value of the coefficients with a value of the trigger phase; and producing a trigger signal to control the sensor to take an image of the blade, responsive to the value of the coefficients matching with the value of the trigger phase.

5. The method for in-situ inspection of a gas turbine engine fan of claim 4 further comprising:

repeating the steps of comparing a value and producing a trigger as time progresses until a blade on a rotor ceases to rotate.

6. The method for in-situ inspection of a gas turbine engine fan of claim 5 further comprising:

producing the image of the at least one blade to include the same pose, illumination and exposure condition.

7. The method for in-situ inspection of a gas turbine engine fan of claim 1 wherein images are captured during gas turbine engine operational conditions selected from the group consisting of coasting, spool-up, and spool-down, including at least one complete revolution.

8. The method for in-situ inspection of a gas turbine engine fan of claim 1 wherein said sensor comprises at least one of, multiple sensors, a camera, a video camera, a high-speed camera, a high-frame-rate camera, and a depth sensor.

* * * * *